United States Patent [19]

Coker et al.

[11] Patent Number: 5,438,460
[45] Date of Patent: Aug. 1, 1995

[54] ASYNCHRONOUS GAIN ADJUSTMENT FOR PRML DISK DRIVE SYSTEMS

[75] Inventors: Jonathan D. Coker; Richard L. Galbraith, both of Rochester, Minn.

[73] Assignee: International Business Machines Corporation, Armonk, N.Y.

[21] Appl. No.: 247,501

[22] Filed: May 23, 1994

Related U.S. Application Data

[63] Continuation of Ser. No. 929,057, Aug. 13, 1992, abandoned.

[51] Int. Cl.6 .............................................. G11B 5/09
[52] U.S. Cl. ........................................ 360/46; 360/32; 341/139
[58] Field of Search .................... 341/139; 360/67, 46, 360/32, 39; 369/59

[56] References Cited

U.S. PATENT DOCUMENTS

| | | | |
|---|---|---|---|
| 3,187,323 | 6/1965 | Flood et al. | 341/139 |
| 4,383,247 | 5/1983 | Assard | 341/139 |
| 4,625,240 | 11/1986 | Yablonski et al. | 341/139 |
| 4,707,681 | 11/1987 | Eggenberger et al. | |
| 4,750,058 | 6/1988 | Hirt et al. | |
| 4,786,890 | 11/1988 | Marcus et al. | |
| 4,804,959 | 2/1989 | Makansi et al. | |
| 4,885,757 | 12/1989 | Provence | |
| 4,887,775 | 12/1989 | Kanaguchi et al. | |
| 4,887,779 | 12/1989 | Large | |
| 4,929,918 | 5/1990 | Chung et al. | |
| 4,945,538 | 7/1990 | Patel | |
| 4,964,107 | 10/1990 | Galbraith et al. | |
| 5,001,482 | 3/1991 | Chung et al. | |
| 5,056,117 | 10/1991 | Gitlin et al. | |
| 5,060,088 | 10/1991 | Dolivo et al. | |
| 5,095,484 | 3/1992 | Karabed et al. | |
| 5,117,199 | 5/1992 | Wang et al. | |
| 5,146,155 | 9/1992 | Trinh Van et al. | 341/139 |
| 5,157,493 | 10/1992 | Hamon et al. | 341/139 |
| 5,233,482 | 8/1993 | Galbraith et al. | 360/46 |

FOREIGN PATENT DOCUMENTS 0269756  6/1988  European Pat. Off.
310290  4/1991  Japan.

OTHER PUBLICATIONS

IBM Technical Disclosure Bulletin, vol. 34, No. 4B, Sep. 1991 "Fast and Accurate Computation of the Amplitude of Quadrature Pairs".

IBM Technical Disclosure Bulletin, vol. 33, No. 3A, Aug. 1990 "DASD Recording Sub-System Parameter Optimization by Head Radius".

*Primary Examiner*—Georgia Y. Epps
*Assistant Examiner*—P. W. Huber
*Attorney, Agent, or Firm*—Joan Pennington; Richard Billion; Pryor A. Garnett

[57] ABSTRACT

Apparatus and method for asynchronous gain adjustment are provided for data detection in a partial-response maximum-likelihood (PRML) data channel. The PRML data channel includes an analog to digital converter (ADC) having a normal operating range and a filter, gain and timing control coupled to the ADC. A plurality of samples are detected from the ADC. Each of the detected samples are sequentially compared with predetermined threshold values. The predetermined threshold values include a zero value, and a minimum value and a maximum value of the normal operating range of the ADC. An absolute value of each of the detected samples are sequentially compared with a forth predetermined threshold value. A gain adjustment correction value is determined utilizing the sequentially compared values.

12 Claims, 3 Drawing Sheets

ASYNCHRONOUS GAIN ADJUSTMENT FOR PRML DISK DRIVE SYSTEMS

This application is a continuation of application Ser. No. 07/929,057, filed Aug. 13, 1992 now abandoned.

BACKGROUND OF THE INVENTION

1. Field of the Invention

The invention relates generally to a direct access storage device (DASD) of the type utilizing partial-response maximum-likelihood (PRML) detection, and more particularly to a method and apparatus for asynchronous gain adjustment for PRML data detection.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

In a PRML data channel, a normalized readback signal amplitude is required for proper data detection. A variable gain amplifier (VGA) typically is used in the analog signal path for scaling of the readback signal. Known PRML channels require an analog envelope detector circuit to sense the amplitude of the incoming readback signal in order to provide gain corrections to the VGA in the idle mode before the PRML channel begins a read or write operation. An acceptable tolerance on the signal amplitude must be maintained during the idle mode in order to guarantee fast convergence at the start of a read operation. Disadvantages of using an analog envelope detector circuit include the usually poor amplitude tolerance without on-chip adjustments because the circuit is analog. Also the analog envelope detector circuit is difficult to build for high speed signals without increasing the circuit power significantly. In addition, recovery from a gain being too low is typically very poor.

SUMMARY OF THE INVENTION

A principal object of the present invention is to provide improved methods for gain adjustment for PRML data detection in a disk drive data storage system. Other objects are to provide such improved gain adjustment methods substantially without negative effects, further that eliminates the need for an analog envelope detector circuit, and that overcome many of the disadvantages of prior art arrangements.

In brief, the objects and advantages of the present invention are achieved by apparatus and method for gain adjustment are provided for data detection in a partial-response maximum-likelihood (PRML) data channel. The PRML data channel includes an analog to digital converter (ADC) having a normal operating range and a variable gain amplifier (VGA) coupled to the ADC. A plurality of samples are detected from the ADC. Each of the detected samples are sequentially compared with predetermined threshold values. The predetermined threshold values include a zero value, and a minimum value and a maximum value of the normal operating range of the ADC. An absolute value of each of the detected samples are sequentially compared with a forth predetermined threshold value. A gain adjustment correction value is determined utilizing the sequentially compared values.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
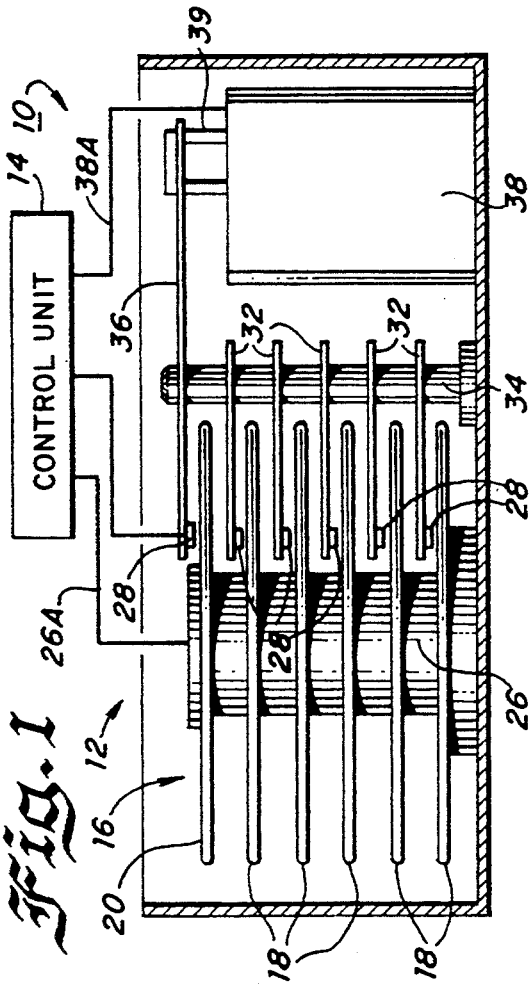
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
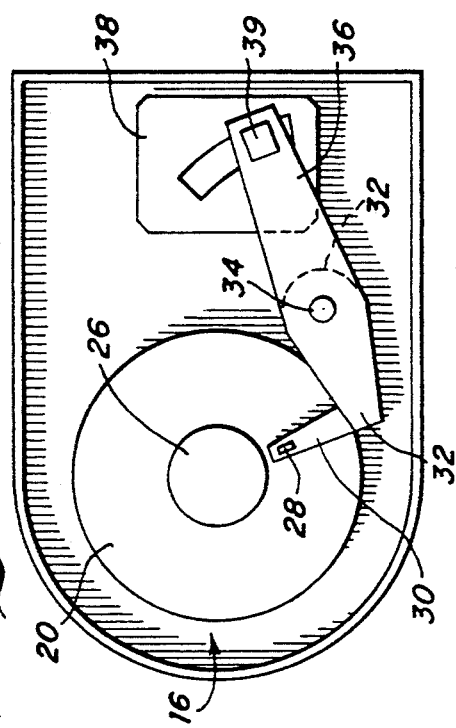
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied. The various components of the disk file 10 are controlled in operation by signals generated by control unit 14 such as motor control signals on line 26A and position control signals on line 38A.

Figure 3:
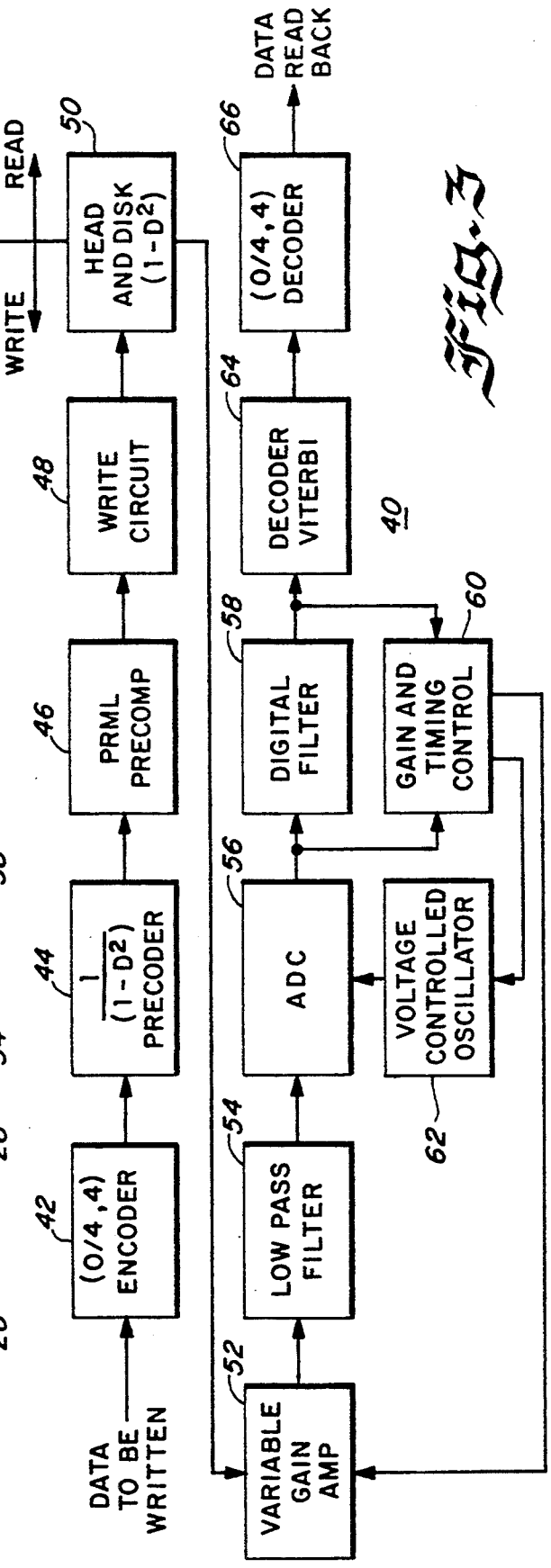
FIG. 3 is a diagram illustrating apparatus a PRML data channel for carrying out gain adjustment methods according to the present invention in the data storage disk file of FIG. 1.

Referring now to FIG. 3, there is shown a block diagram of the PRML data channel 40 for carrying out gain adjustment methods of the invention. The PRML recording channel uses class IV partial-response (PR) signals accomplished by a PR-IV filter function. Data to be written is applied to an encoder 42 for providing a modulation coded output having predefined run length constraints, such as for the minimum and maximum number of consecutive zeros and the maximum run length of zeros in the even and odd recorded sequences in the overall recorded sequence. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52. The amplified read signal is applied to a lowpass filter 54. The filtered read signal is converted to digital form by an analog to digital converter (ADC) 56 that provides, for example, 64 possible 6-bit sampled values.

The samples of the ADC 56 are applied to a digital filter 58, such as a 10 tap finite impulse response (FIR) digital filter, and are applied to a gain and timing control 60. The gain and timing control 60 provides a gain and ac coupling pole control signal to the VGA 52 and provides a timing control signal to the ADC 56 via a voltage controlled oscillator 62. The filtered signal from the digital filter 58 is applied to a Viterbi decoder 64 coupled to a decoder 66 to complete the maximum-likelihood (ML) detection process for data read back.

In accordance with a feature of the present invention, gain adjustment is an integrated function of the partial-response maximum-likelihood (PRML) channel 40 available in the disk file 10.

Figure 4:
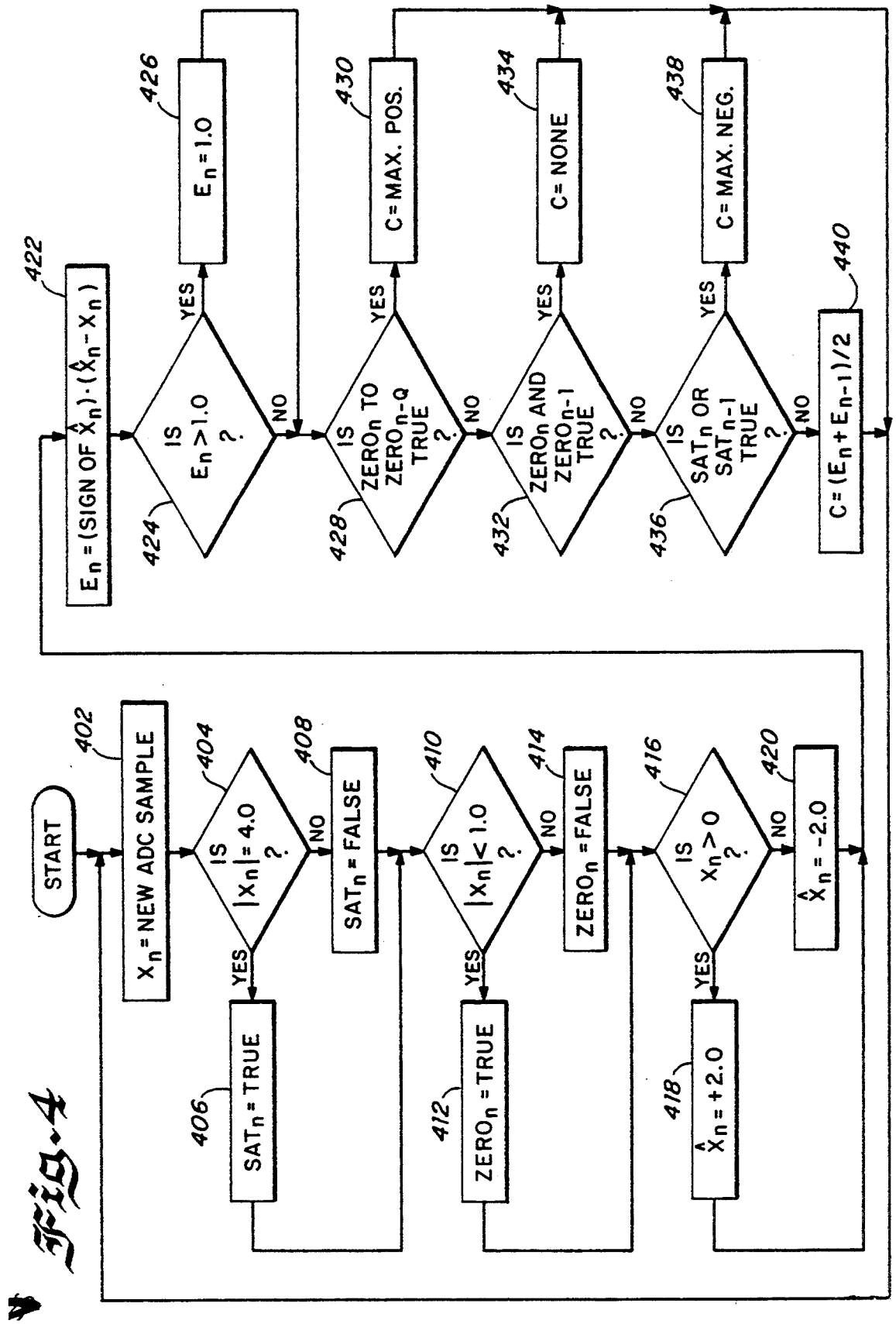
FIGS. 4 is a logic block flow diagram illustrating a gain adjustment method according to the present invention in the data storage disk file of FIG. 1.

Referring to FIG. 4, there is shown a flow chart illustrating the sequential operations of the asynchronous gain adjustment algorithm (AGAA).

The AGAA uses the ADC samples in the PRML channel. By asynchronously sampling the sync field pattern (1/4T), the AGAA guarantees a normalized amplitude of $1.05\pm5\%$ without requiring any trims or external components. Because the ADC samples are used, all tolerances in the ADC 56 are fully accommodated. On random data patterns, the AGAA is comparable in performance to the conventional analog envelope detector.

A current sample is read from the ADC 56 as indicated at a block 402 labelled $X_n$=NEW ADC SAMPLE, where ADC range is between $+4.0$ to $-4.0$. During the idle mode, the analog-to-digital converter provides samples with the sampling being asynchronous to the data on the disk although the frequency of the sampling is roughly correct. In the channel IDLE mode, the ADC samples are asynchronous with respect the read-back signal, for example, where frequency is $\pm1\%$ and the phase is indeterminate.

As indicated at a decision block 404 an absolute value of the sample is compared with a maximum threshold value. If $|X_n|=4.0$, indicating that the samples saturate the ADC 56, then a saturation indication is set as $Sat_n=$TRUE as indicated at a block 406 or else $Sat_n$=FALSE as indicated at a block 408.

Next as indicated at a decision block 410 an absolute value of the sample is compared with a predetermined value to detect abnormally low sample values. If $|X_n|<1.0$ then a null signal indication is set as $Zero_n=$TRUE as indicated at a block 412 or else $Zero_n$=FALSE as indicated at a block 414.

Then as indicated at a decision block 416, if $X_n>0$ then the ideal sample value is set as $Xn=+2.0$ as indicated at a block 418. Else the ideal sample value is set as $X_n=-2.0$ as indicated at a block 420. A value used for error correction is calculated as indicated at a block 422 labelled $E_n=$(sign of $X_n$)·$(X_n-X_n)$. Then the calculated value $E_n$ is threshold compared as indicated at a decision block 422 labelled $E_n>1.0$. If $E_n>1.0$, then $E_n=1.0$ as indicated at a block 426.

Next a plurality of samples from $Zero_n$ through $Zero_{n-Q}$, where Q is selected in a range between 10–30 are checked for too low gain. When samples $Zero_n$ through $Zero_{n-Q}$ are identified to be TRUE at a decision block 428, then a correction value is set $C_n=$MAXIMUM POSITIVE as indicated at a block 430. Else if the two consecutive samples $Zero_n$ and $Zero_{n-1}$ are identified to be TRUE at a decision block 432, the correction value is set $C_n=$NONE as indicated at a block 434 so that no correction is provided over short areas of null signal. Else if the two consecutive samples $Sat_n$ or $Sat_{n-1}$ are identified to be TRUE at a decision block 436, then the correction value is set $C_n=$MAXIMUM NEGATIVE as indicated at a block 438. Otherwise a linear correction is provided with the correction value $C_n=(E_n+E_{n-1})\div 2$ using two consecutive calculated values as indicated at a block 440.

Figure 5:
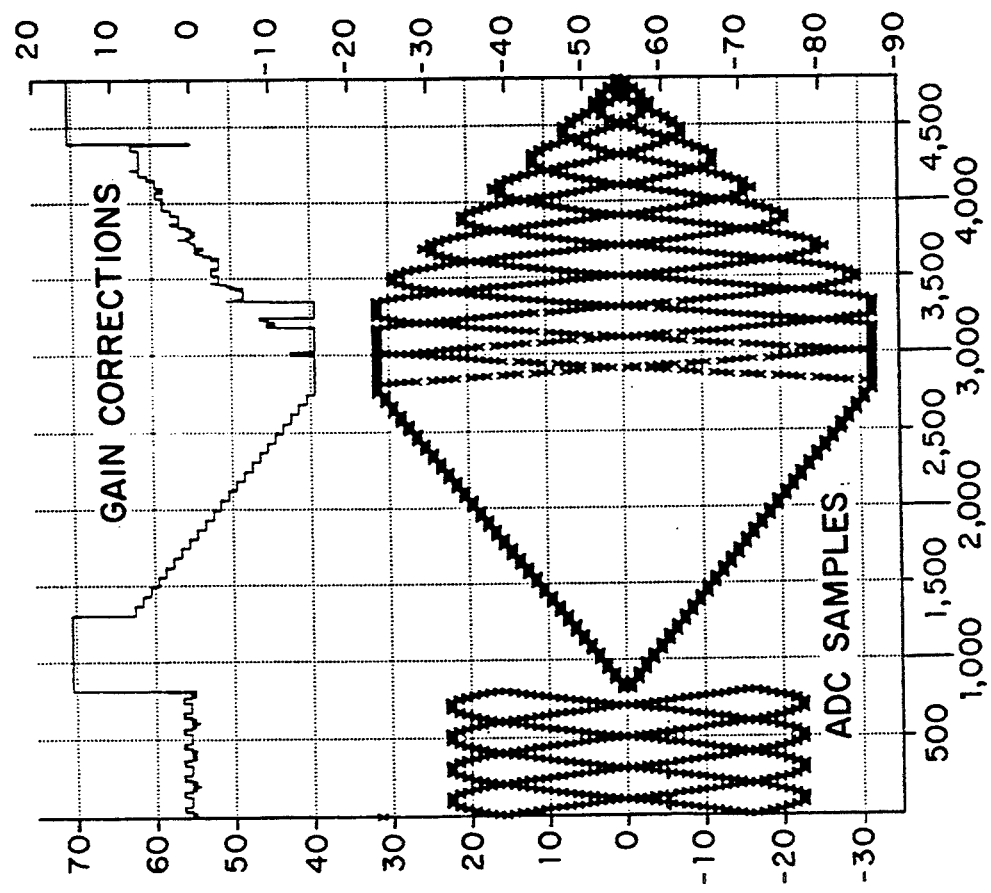

In FIG. 5, the operation of the gain adjustment algorithm is illustrated. FIG. 5 shows the sync field pattern being sampled both asynchronously and synchronously with various amplitudes. Since synchronous sampling is a degenerate case of asynchronous sampling, the AGAA can provide gain corrections during the acquisition read mode using synchronous sampling of the sync field pattern. Thus, the AGAA can be used for dual purposes eliminating an asynchronous envelope detector in an idle mode, and providing a synchronous gain setting algorithm in an acquisition read mode.

Figure 6:
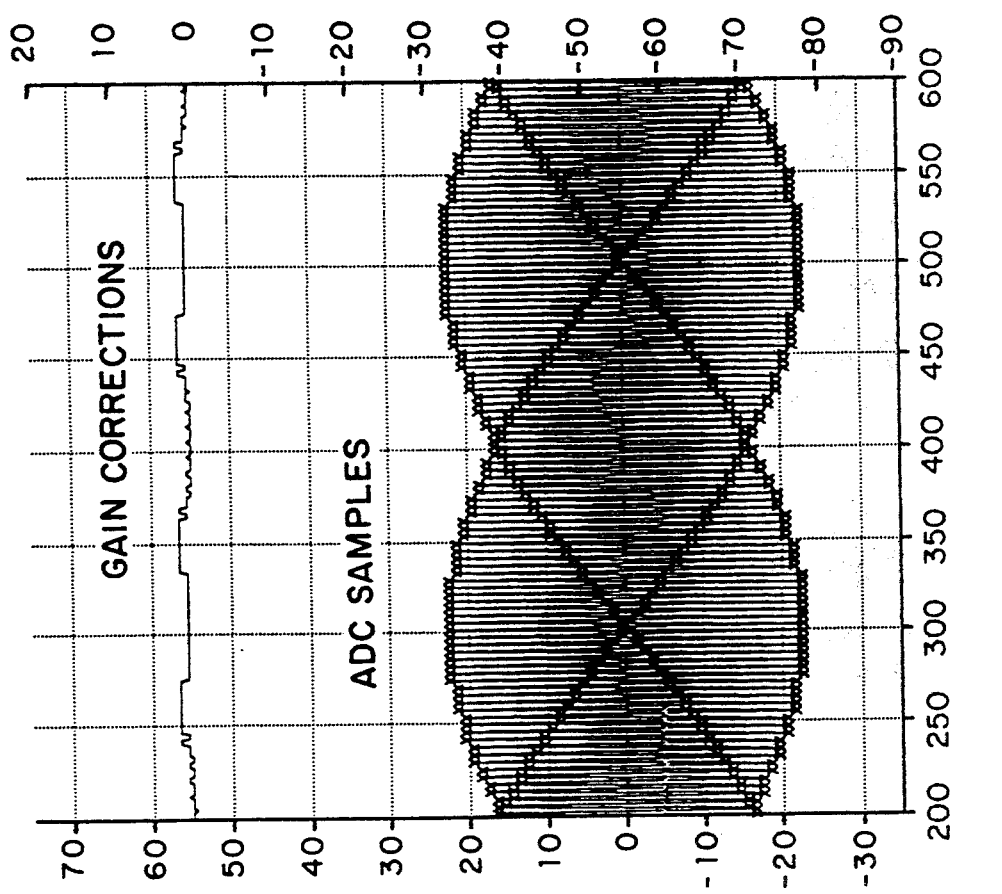
FIGS. 5 and 6 are graphs to illustrate the operation of asynchronous and synchronous sampling for the gain adjustment methods of the present invention.

An expanded view of the operation of the algorithm using the sync field pattern at correct amplitude and sliding phase is shown by FIG. 6.

In brief summary because the invention is implemented in digital logic, abnormally low or high signal amplitudes are easily detected. The present invention guarantees proper operation using asynchronous samples. The AGAA provides for maximum positive gain correction when a series of samples appear low in amplitude. Also, maximum negative gain correction is provided when samples saturate the ADC converter. Also the AGAA can be implemented without requiring any additional analog circuits beyond what is already present in the PRML channel.

What is claimed and desired to be secured by Letters Patent of the United States is:

1. A method of gain adjustment for data detection in a partial-response maximum-likelihood (PRML) data channel including a variable gain amplifier (VGA) coupled to an analog to digital converter (ADC) having a normal operating range, an analog envelope detector not being utilized with said PRML, said method comprising the steps of:

detecting a plurality of samples from the ADC by asynchronous sampling during an idle mode of the PRML channel;

sequentially comparing each of said detected plurality of samples with a zero threshold value;

sequentially comparing an absolute value of each of said detected plurality of samples with a predetermined maximum threshold value and a predetermined minimum threshold value; and determining a gain adjustment correction value utilizing said sequentially compared values.

2. A method as recited in claim 1 further comprising the step of:

applying said determined gain adjustment correction value to the VGA.

3. A method as recited in claim 1 wherein the step of comparing said absolute value of said detected samples with said predetermined maximum threshold value identifies a saturation operation of the ADC responsive to identifying equal values.

4. A method as recited in claim 1 wherein the step of sequentially comparing said absolute value of each of said detected plurality of samples with a said predetermined minimum threshold value includes the step of:

identifying an amplitude of a plurality of sample values from the ADC; and comparing said amplitude of said detected samples with said predetermined minimum threshold value to identify a substantially null signal operation of the ADC responsive to said identified amplitude being less than said predetermined threshold value.

5. A method as recited in claim 4 further includes the steps of:

determining a gain adjustment correction value corresponding to a maximum positive correction value when a predetermined number of said sequentially compared values identify a substantially null signal operation of the ADC; and applying said determined gain adjustment correction value to the VGA.

6. A method as recited in claim 3 further includes the steps of:

determining a gain adjustment correction value corresponding to a maximum negative correction value when a predetermined number of sequentially compared values identify said saturation operation of the ADC.

7. A method as recited in claim 1 further includes the step of detecting a plurality of samples from the ADC by synchronously sampling during an acquisition read mode of the PRML channel.

8. Apparatus for gain adjustment for data detection in a partial-response maximum-likelihood (PRML) data channel including an analog to digital converter (ADC) having a normal operating range, and a variable gain amplifier (VGA) coupled to the ADC, an analog envelope detector not being utilized with said PRML, said apparatus comprising:

asynchronous sampling means for detecting a plurality of samples from the ADC during an idle mode of the PRML channel;

means for sequentially comparing each of said detected plurality of samples with a zero threshold value;

means for sequentially comparing an absolute value of each of said detected plurality of samples with a predetermined maximum threshold value and a predetermined minimum threshold value; and means for determining a gain adjustment correction value utilizing said sequentially compared values.

9. Apparatus as recited in claim 8 further comprising:

means for providing said gain adjustment correction value to said VGA.

10. Apparatus as recited in claim 8 wherein said means for sequentially comparing said absolute value of each of said detected plurality of samples include:

means for maximum threshold comparing said sampled values to detect a saturation operation of said ADC responsive to equal compared values.

11. Apparatus as recited in claim 8 wherein said means for sequentially comparing said absolute value of each of said detected plurality of samples include:

means for minimum threshold comparing said sampled values to detect a substantially null signal operation of said ADC responsive to compared values of less than said predetermined minimum threshold value.

12. A direct access storage device of the type including a partial-response maximum-likelihood (PRML) data channel, an analog envelope detector not being utilized with said PRML, comprising:

a housing;

at least one disk mounted in said housing for rotation about an axis and having at least one disk surface for storing data;

transducer means mounted for movement across said disk surface for reading and writing data to said disk surface;

an analog to digital converter (ADC) coupled to said transducer means for converting an analog input signal to digital sample values within a normal operating range;

asynchronous sampling means for detecting a plurality of samples from the ADC during an idle mode of the PRML channel;

means for sequentially comparing each of said detected plurality of samples with a zero threshold value;

means for sequentially comparing an absolute value of each of said detected plurality of samples with a predetermined maximum threshold value and a predetermined minimum threshold value; and means for determining a gain adjustment correction value utilizing said sequentially compared values.

* * * * *